United States Patent
Argue et al.

(10) Patent No.: US 9,953,362 B2
(45) Date of Patent: Apr. 24, 2018

(54) MOBILE-COMPUTING-DEVICE-SECUREMENT APPARATUS AND METHOD

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 958 days.

(21) Appl. No.: 14/312,444

(22) Filed: Jun. 23, 2014

(65) Prior Publication Data
US 2015/0371320 A1    Dec. 24, 2015

(51) Int. Cl.
| | |
|---|---|
| *G06Q 30/00* | (2012.01) |
| *G06Q 30/06* | (2012.01) |
| *H04M 1/04* | (2006.01) |
| *B62B 3/14* | (2006.01) |

(52) U.S. Cl.
CPC ........... *G06Q 30/0641* (2013.01); *B62B 3/14* (2013.01); *G06Q 30/0633* (2013.01); *H04M 1/04* (2013.01)

(58) Field of Classification Search
CPC . G06Q 30/00; G06Q 30/0601; G06Q 30/0641
See application file for complete search history.

(56) References Cited

U.S. PATENT DOCUMENTS

| | | | | |
|---|---|---|---|---|
| 5,424,524 | A * | 6/1995 | Ruppert | ................ G06K 17/00 235/383 |
| 6,932,309 | B1 | 8/2005 | Corey | |
| 7,040,590 | B2 | 5/2006 | Carnevali | |
| 8,128,046 | B1 | 3/2012 | Howard, Jr. | |
| 8,135,617 | B1 * | 3/2012 | Agostino | .......... G06Q 30/0241 705/1.1 |
| 8,360,378 | B1 | 1/2013 | Owens | |
| 8,382,059 | B2 | 2/2013 | Le Gette | |
| 8,408,513 | B2 | 4/2013 | Smith | |
| 8,474,832 | B2 | 7/2013 | Mersky | |

(Continued)

OTHER PUBLICATIONS

Baloukas, Bill, and Ludvik Martinu. "Metameric interference security image structures." Applied optics 47.10 (2008): 1585-1593.*

*Primary Examiner* — Michael Misiaszek
*Assistant Examiner* — Christopher B Seibert
(74) *Attorney, Agent, or Firm* — Bryan Cave LLP

(57) ABSTRACT

A shopping system may include a mobile shopping aid sized to support thereon or therewithin one or more items to be purchased. A holder may be connected to the mobile shopping aid to travel therewith. The holder may be sized and shaped to hold a mobile computing device. The holder may have a front aperture enabling an owner of the mobile computing device to view a display screen of the mobile computing device while the mobile computing device is being held by the holder. The holder may also have a back aperture enabling a back-facing camera of the mobile computing device to scan one or more barcodes while the mobile computing device is being held by the holder. The system may also include an anti-theft program or module programmed to initiate an alarm protocol in the event that the mobile computing device is untimely removed from the holder.

20 Claims, 8 Drawing Sheets

(56) References Cited

U.S. PATENT DOCUMENTS

| | | |
|---|---|---|
| 8,477,931 B2 | 7/2013 | Thompson |
| 8,672,199 B1 | 3/2014 | Ditore |
| 2002/0165931 A1* | 11/2002 | Greer .................... G06Q 30/02 709/217 |
| 2005/0284904 A1 | 12/2005 | Knapp |
| 2006/0113342 A1 | 6/2006 | Hampton |
| 2007/0278265 A1 | 12/2007 | Contente |
| 2009/0088203 A1* | 4/2009 | Havens .............. G06K 7/10881 455/556.1 |
| 2010/0072715 A1 | 3/2010 | Crum |
| 2011/0208613 A1* | 8/2011 | Parham .............. G06Q 30/0623 705/26.61 |
| 2012/0168471 A1 | 7/2012 | Wilson |
| 2012/0285907 A1 | 11/2012 | Emmons |
| 2013/0304609 A1* | 11/2013 | Keonorasak ........... G06Q 30/00 705/26.8 |
| 2014/0069973 A1* | 3/2014 | Peck ...................... B60R 11/02 224/411 |
| 2014/0090209 A1 | 4/2014 | Smith |
| 2014/0091192 A1* | 4/2014 | Mersky ................ F16M 11/041 248/447 |
| 2014/0265185 A1* | 9/2014 | Mersky ................ B62B 3/1428 280/33.992 |
| 2014/0339278 A1* | 11/2014 | Ditore ...................... B62B 5/00 224/411 |

* cited by examiner

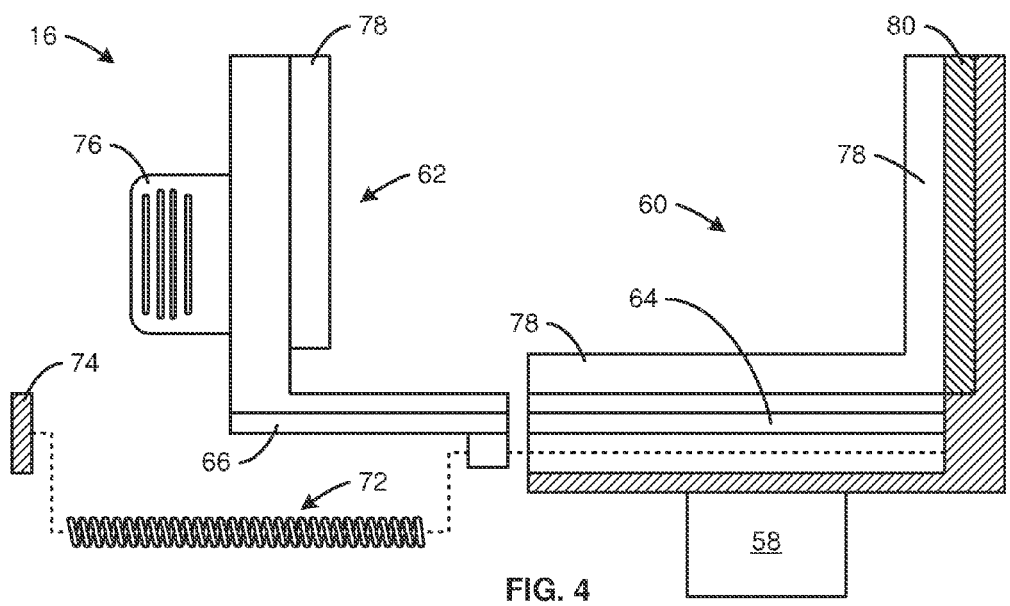
FIG. 4
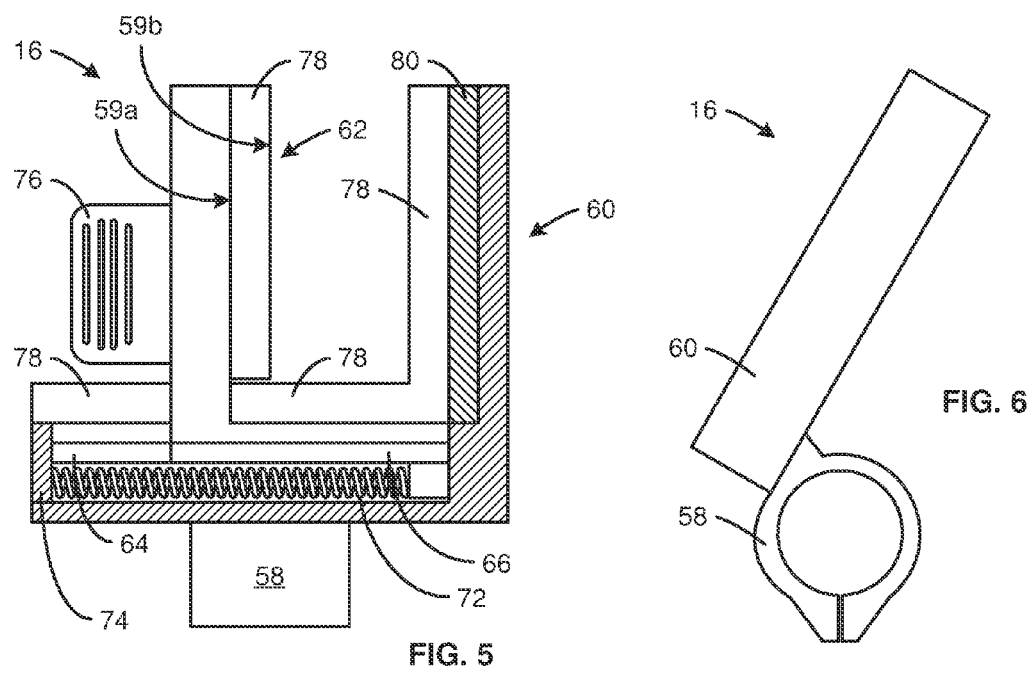
FIG. 5
FIG. 6

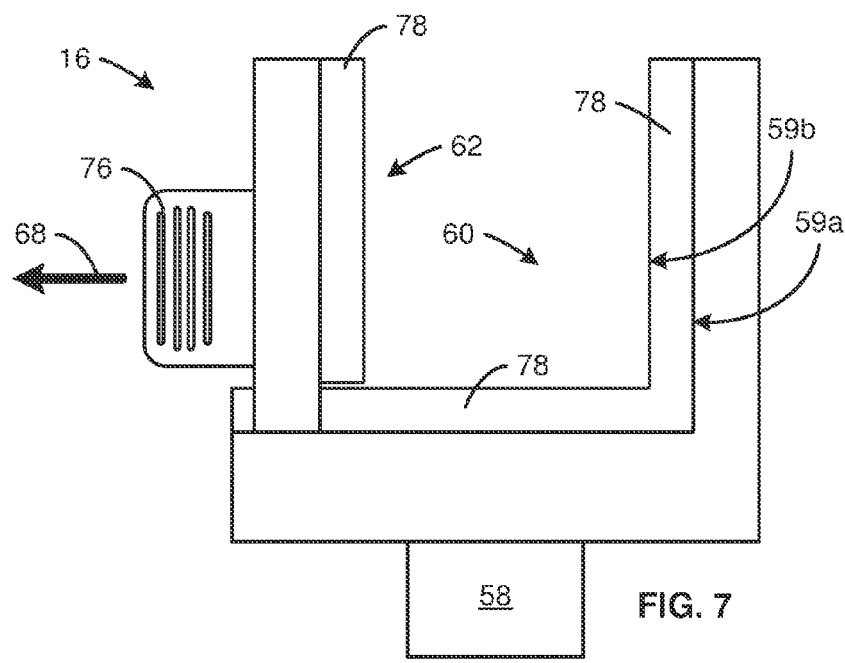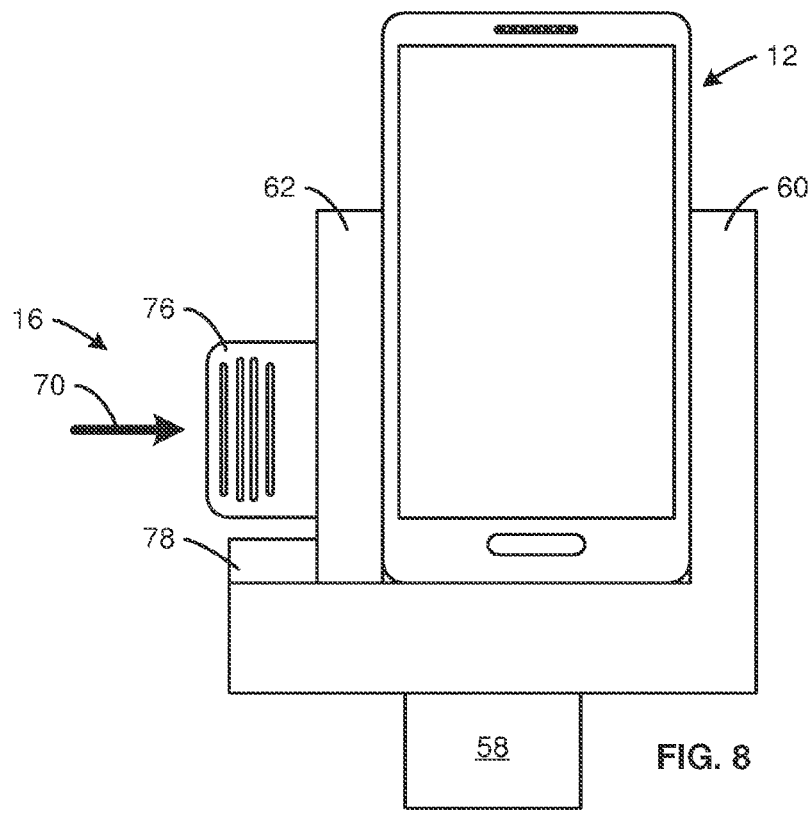

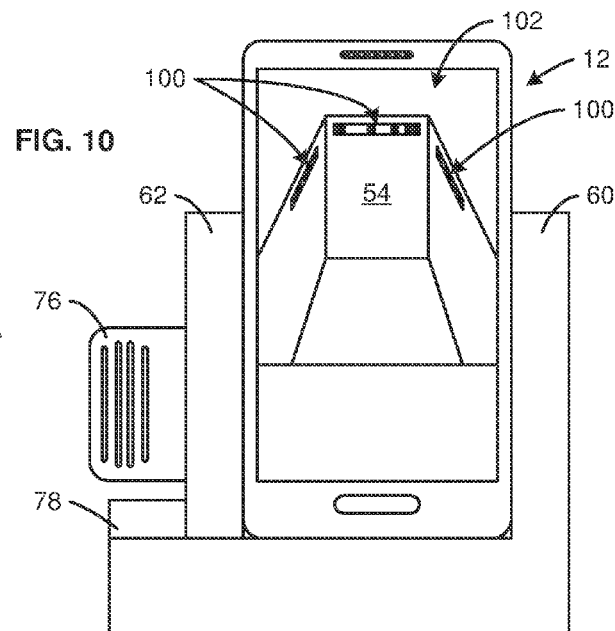
FIG. 10
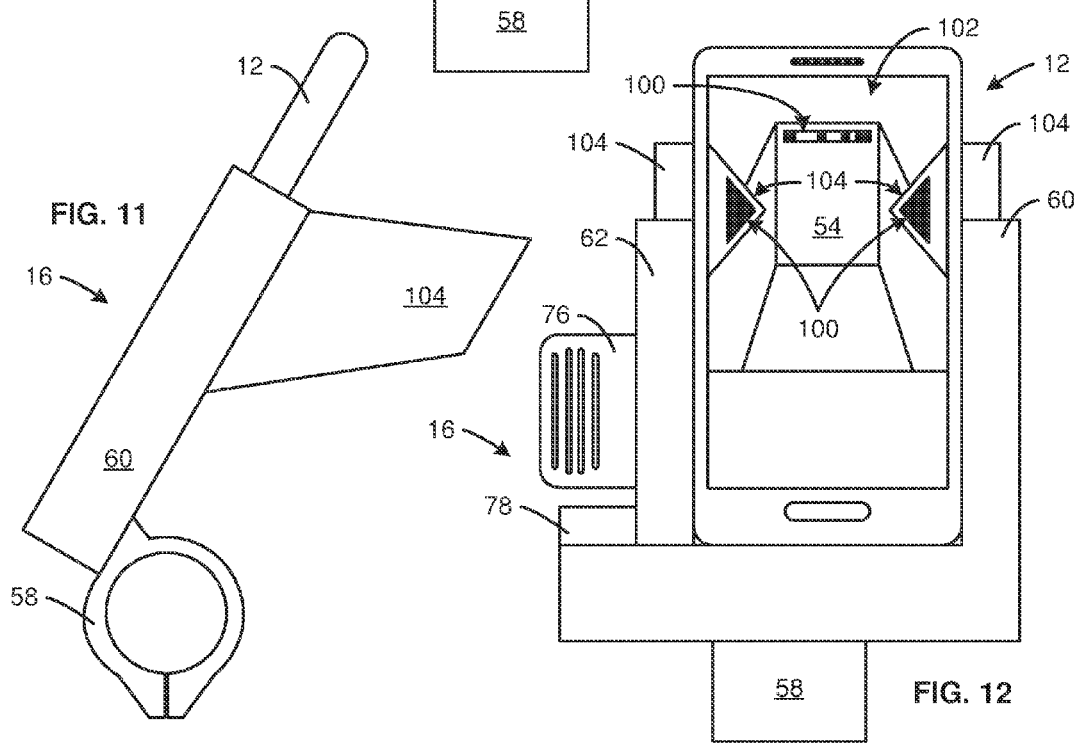
FIG. 11
FIG. 12

MOBILE-COMPUTING-DEVICE-SECUREMENT APPARATUS AND METHOD

BACKGROUND

Field of the Invention

This invention relates to mobile computing devices and more particularly to systems and methods for holding and securing a mobile computing device in a brick-and-mortar shopping environment.

Background of the Invention

As mobile computing devices have matured, their impressive features and capabilities have made them useful in the shopping environment. However, in a shopping environment, a customer may desire to have his or hands free to inspect products, select products, place products into a shopping cart, or the like. As a result, holding a mobile computing device in a hand or repeatedly retrieving a mobile computing device from a pocket or purse may be undesirable. Moreover, leaving a mobile computing device out (e.g., in a shopping cart) may expose the mobile computing device to theft. Accordingly, what is needed is a system supporting easy and secure incorporation of a customer's mobile computing device into a brick-and-mortar shopping environment.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 4 is a front, exploded view of one embodiment of a holder in accordance with the present invention with a base thereof shown in cross-section;

FIG. 5 is a front, assembled view of the holder of FIG. 4 with the base thereof shown in cross-section;

FIG. 6 is a side, assembled view of the holder of FIG. 4;

FIG. 7 is a front, assembled view of the holder of FIG. 4 with the holder open to receive a mobile computing device therewithin;

FIG. 8 is a front, assembled view of the holder of FIG. 4 with the holder holding a mobile computing device;

FIG. 10 is a front, assembled view of the holder of FIG. 4 with the holder holding a mobile computing device displaying an image capturing multiple security icons;

FIG. 11 is a side view of one embodiment of a mobile computing device secured within an alternative embodiment of a holder including one or more supports for supporting and positioning one or more security icons;

FIG. 12 is a front view of the mobile computing device and holder of FIG. 11 with an image containing multiple security icons, including two supported by opposing supports extending as part of the holder, being displayed by the mobile computing device.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
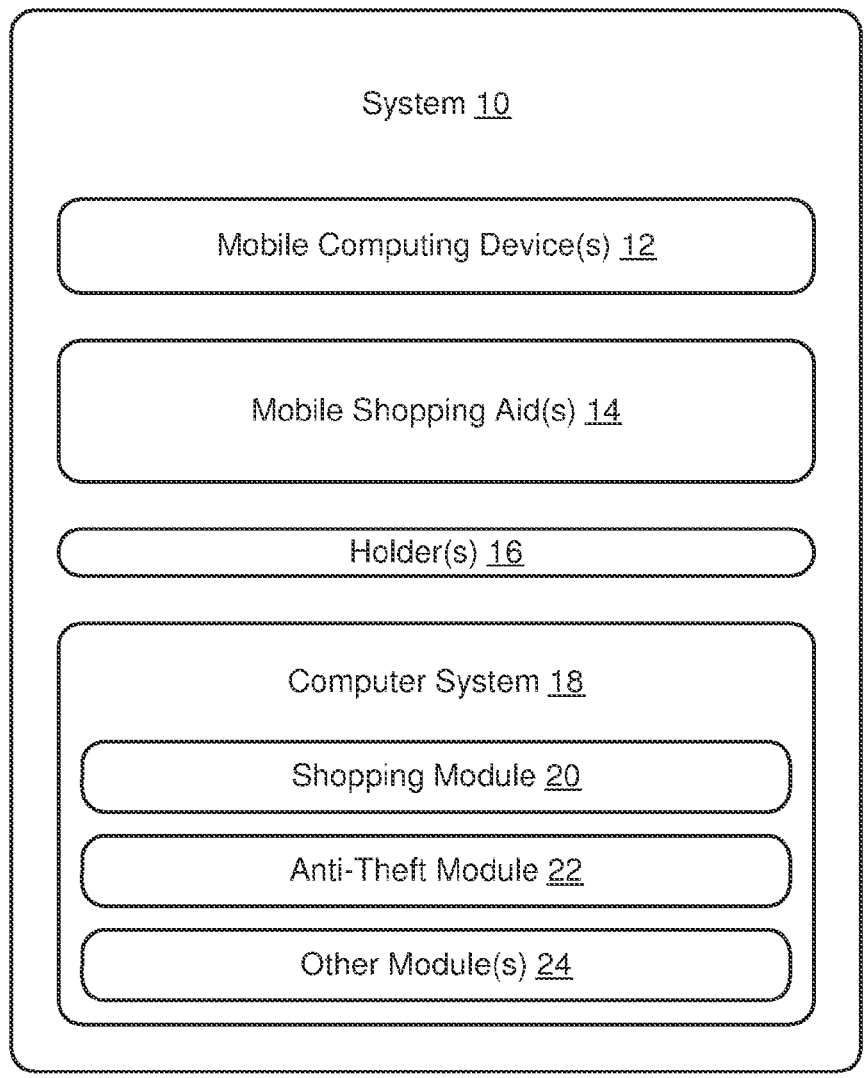
FIG. 1 is a schematic block diagram of one embodiment of a system in accordance with the present invention.

Referring to FIG. 1, a system 10 in accordance with the present invention may provide, support, or enable an improved shopping experience. In selected embodiments, a system 10 may do this by supporting the incorporation of a customer's mobile computing device 12 into the shopping environment. As mobile computing devices 12 have matured, their impressive features and capabilities have made them a useful part of the shopping experience. While shopping in a brick-and-mortar store, a customer may now use his or her mobile computing device 12 to call someone with a question about a particular product, view or edit a shopping list, conduct product research on the Internet, or the like. Additional uses for mobile computing devices 12 in the shopping environment are being developed. Thus, by supporting the incorporation of a mobile computing device 12 into the shopping environment, a system 10 may provide significant benefits to customers.

A system 10 in accordance with the present invention may support the incorporation of a customer's mobile computing device 12 into the shopping environment in any suitable manner. A system 10 may include hardware, software, or a combination of hardware and software. In selected embodiments, a system 10 may include one or more mobile computing devices 12, one or more mobile shopping aids 14, one or more holders 16, a computer system 18, or the like or a combination or sub-combination thereof.

A mobile computing device 12 may be incorporated into a system 10 by a customer that owns or possess the mobile computing device 12. Accordingly, in selected embodiments, a mobile computing device 12 in accordance with the present invention may comprise any computing device that a customer wishes to carry into a brick-and-mortar store. In certain embodiments, a mobile computing device 12 may be relatively small and easily ported from one location to another. A mobile computing device 12 may also include one or more features or capabilities that are useful within a shopping environment. In selected embodiments, a mobile computing device 12 may comprise a mobile telephone, smartphone, personal digital assistant (PDA), tablet computer, e-reader, music player, netbook, laptop computer, or the like.

A mobile shopping aid 14 may be a device provided, offered, loaned, or the like at a brick-and-mortar store to assist a customer in his or her shopping. In selected embodiments, a mobile shopping aid 14 may facilitate the transport of one or more products to be purchased. For example, a mobile shopping aid 14 may provide a location onto or into which a customer may place one or more products as he or she moves through a brick-and-mortar store. In certain embodiments, a mobile shopping aid 14 may be or include a shopping basket (e.g., a customer-carried container), a shopping cart (e.g., a customer propelled shopping cart, a motorized or self-propelled shopping cart or vehicle, a flat bed cart, or other mobile container or platform), or the like.

A holder 16 may support or hold a mobile computing device 12 while a customer (e.g., an owner of the mobile computing device 12) is shopping. While shopping, a customer may desire to have his or hands free to inspect products, select products, place products into or onto a mobile shopping aid 14, hold, push, or otherwise manage a mobile shopping aid 14, access or use one or more features or capabilities of his or her mobile computing device 12, or the like. As a result, holding a mobile computing device 12 in a hand or repeatedly retrieving a mobile computing device 12 from a pocket or purse may be undesirable. Accordingly, a holder 16 may hold a mobile computing device 12 so that it can be used while it is being held. Thus, a customer may have his or her hands free while maintaining ready access to his or her mobile computing device 12.

A computer system 18 in accordance with the present invention may provide, support, or enable a desired shopping environment in any suitable manner. In selected embodiments, a computer system 18 may support integration of a mobile computing device 12 into a shopping environment. A computer system 18 may include any suitable arrangement of sub-components or modules. In certain embodiments, a computer system 18 may include a shopping module 20, anti-theft module 22, one or more other modules 24 as desired or necessary, or the like or some combination or sub-combination thereof.

A shopping module 20 may enable one or more mobile computing devices 12 to participate in one or more shopping experiences. In selected embodiments, this may be accomplished through an electronic receipts program, shopping list program, or the like or a combination thereof. Alternatively, or in addition thereto, it may be accomplished in the form of a self check-out program or system.

For example, a shopping module 20 may enable a customer to advance through a store selecting and scanning one or more products for purchase. A camera on a mobile computing device 12 may be used to capture a UPC code or the like. Accordingly, a customer may select a product, capture a UPC code from the product, and place the product on or in a mobile shopping aid 14.

Upon capturing a UPC code or the like, a shopping module 20 may enable a corresponding mobile computing device 12 to receive information about the product. For example, self-checkout functionality of a shopping module 20 may obtain information about a product and create an electronic shopping cart with the information received. The self-checkout functionality may provide a user interface on the mobile computing device 12. Accordingly, a mobile computing device 12 may display to a corresponding customer a list of selected products, corresponding prices, or the like.

Pressing a "checkout" button or the like may cause a shopping module 20 or certain self-check functionality thereof to enter a checkout mode. Accordingly, a shopping module 20 may prepare the list of selected products for checkout. For example, a shopping module 20 may prepare certain information regarding the selected products for transmittal to a point-of-sale (POS) terminal or system or the like through or at which the corresponding customer may submit payment.

An anti-theft module 22 may seek to protect a mobile computing device 12 held within a holder 16. In a customer's pocket, purse, hand, or the like, a mobile computing device 12 may be relatively secure. However, in a holder 16, a mobile computing device 12 may be more visible to others, farther from the immediate grasp of an owner, and potentially outside an owner's field of view. Accordingly, an anti-theft module 22 may support or enable functionality that overcomes or limits the insecurity associated with use of a holder 16 in accordance with the present invention.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code (e.g., code corresponding to a shopping module 20, anti-theft module 22, or the like or a combination thereof) may execute entirely on a mobile computing device 12, partly on a mobile computing device 12, as a stand-alone software package, on a stand-alone hardware unit, partly on a POS computer, or partly on a remote computer or server. In the latter scenario, a remote computer may be connected to a mobile computing device 12, a POS or other on-site computer, or a combination thereof through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
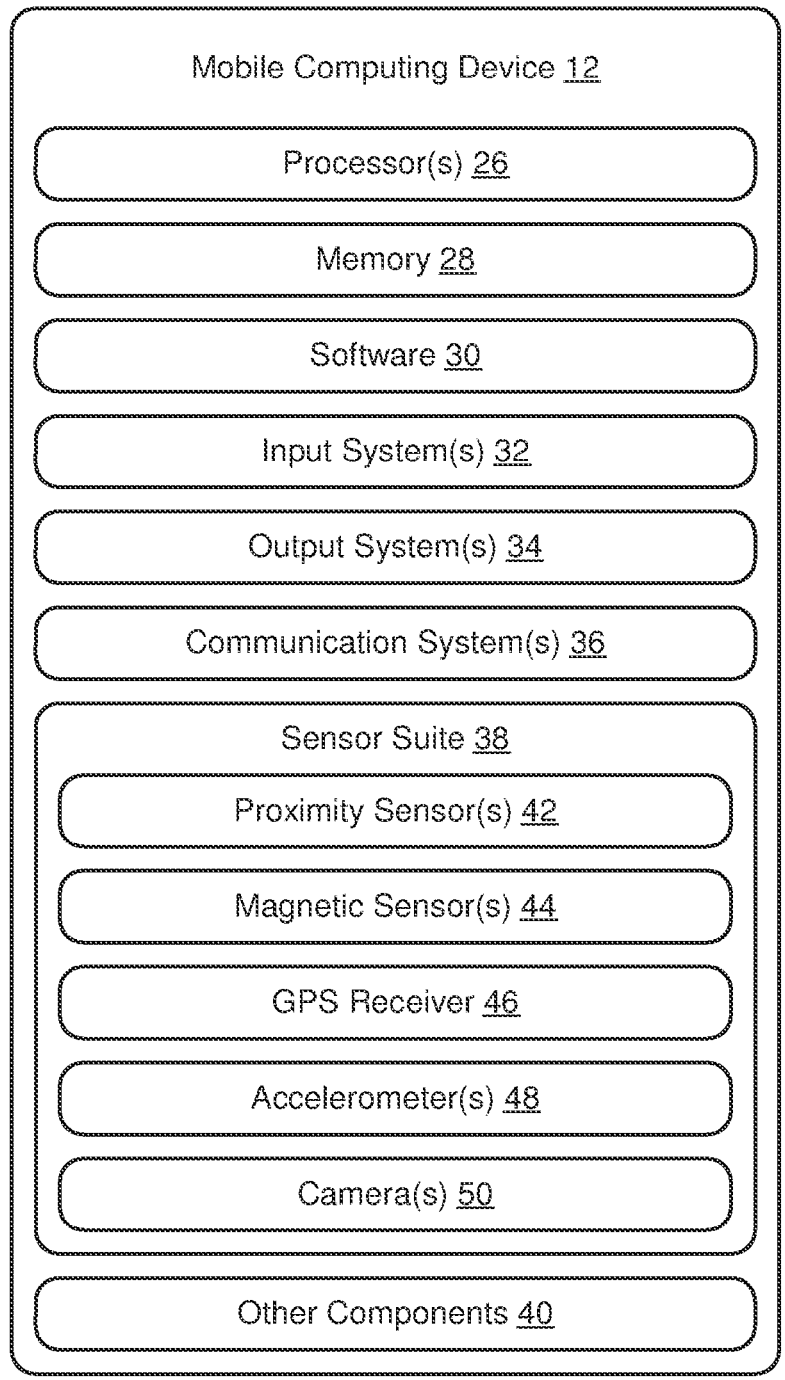
FIG. 2 is a schematic block diagram of one embodiment of a mobile computing device for use in a system in accordance with the present invention.
Figure 3:
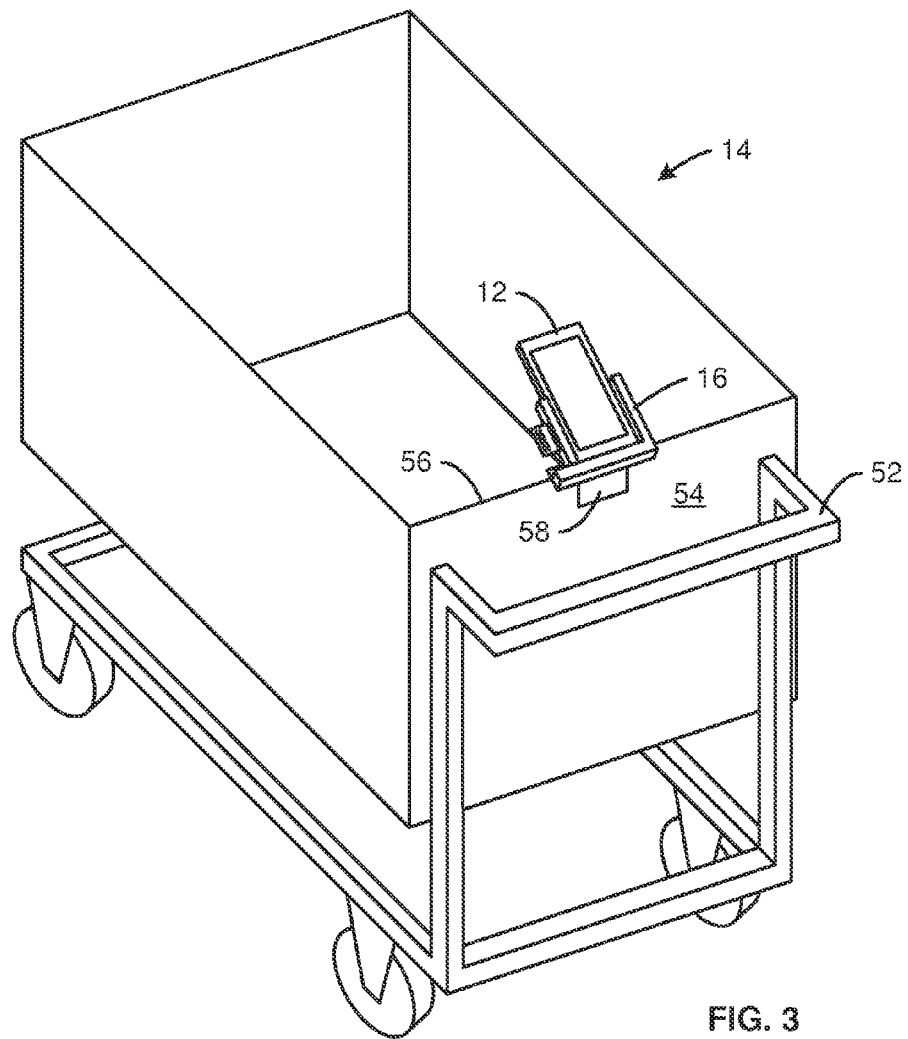
FIG. 3 is a perspective view of one embodiment of a mobile computing device, holder, and mobile shopping aid in accordance with the present invention.

Referring to FIG. 2, a mobile computing device 12 for use in a system 10 in accordance with the present invention may have any suitable hardware, software, or combination of hardware and software. For example, in selected embodiments, a mobile computing device 12 may include one or more processors 26, memory devices 28, software applications or modules 30, input systems 32, output systems 34, communication systems 36, sensor suites 38, other components 40, or the like or a combination or sub-combination thereof.

In certain embodiments, one or more processors 26 may be operably connection to one or more memory devices 28. The one or more memory devices 28 may store selected software 30 (e.g., an operating system, all or some portion of a shopping module 20, all or some portion of an anti-theft module 22, or the like or a combination or sub-combination thereof). Accordingly, the one or more processors 26 may run or execute software 30 stored on the one or more memory devices 28.

One or more input and output systems 32, 34 may enable a customer to input information into a mobile computing device 12 and received information therefrom. Accordingly, one or more input and output systems 32, 34 may collectively form a user interface of a mobile computing device 12. In selected embodiments, an input system 32 may include a keyboard, pointing device, microphone, or the like or a combination or sub-combination thereof. An output system 34 may include a display or screen.

In certain embodiments, an input system 32 and output system 34 may be combined in the form of a touch screen. That is, a touch screen may function sequentially or simultaneously as both an output device 34 and an input device 32. For example, a touch screen may output (e.g., display) images, text, or the like or combinations thereof to a human user. Moreover, by touching a touch screen in a particular manner, the human user may input or communicate one or more commands.

A communication system 36 may enable a mobile computing device 12 to communicate with one or more other devices (e.g., servers, other mobile computing devices 12, or the like). A communication system 36 may include one or more wireless transceivers for performing wireless communication. For example, a communication system 36 may enable a mobile computing device 12 to send or receive information over the cellular network of a telecommunications provider. Alternatively, or in addition thereto, a communication system 36 may enable a mobile computing device 12 to send or receive information (e.g., access the Internet) over a local area network (e.g., a local wireless network) or the like.

In selected embodiments, a mobile computing device 12 may include a sensor suite 38. A sensor suite 38 may include one or more sensors supporting the operation of the corresponding mobile computing device 12. Additionally, in certain embodiments, one or more sensors of a sensor suite 38 may be used to enable or support selected functionality of a computer system 18 in accordance with the present invention. For example, one or more sensors of a sensor suite 38 may be used to enable or support the operation of an anti-theft module 22.

A sensor suite 38 may include any desired or suitable collection of sensors. For example, in selected embodiments, a sensor suite 38 may include one or more proximity sensors 42, magnetic sensors 44, global positioning system (GPS) receivers 46, accelerometers 48, cameras 50, or the like or a combination or sub-combination thereof. Accordingly, in certain embodiments, a computer system 18 in accordance with the present invention may use the outputs of one or more such sensors to determine when a mobile computing device 12 has been removed from a holder 16, track a mobile computing device 12, or the like to enable or support the operation of an anti-theft module 22.

Referring to FIG. 3-8, in selected embodiments, a holder 16 may be connected to a mobile shopping aid 14. A holder 16 may be connected to a mobile shopping aid 14 in any suitable manner. For example, a holder 16 may be formed as an integral or monolithic portion or extension of a mobile shopping aid 14. Alternatively, a holder 16 may be an add-on that is clamped, bolted, screwed, welded, glued, or otherwise secured to some portion of mobile shopping aid 14.

For example, in selected embodiments, a holder 16 may include a mount 58 forming an interface between the rest of the holder 16 and a corresponding mobile shopping aid 14. A mount 58 may connect to or extend from any suitable portion or piece of a mobile shopping aid 14. For example, a holder 16 may connect to or extend from a handle 52, container wall 54, container edge 56, child seat, or the like of a mobile shopping aid 14. The shape or configuration of a mount 58 may correspond to (e.g., match, fit, or the like) the portion or piece of a mobile shopping aid 14 to which the mount 58 secures.

In selected embodiments, a holder 16 may hold a mobile computing device 12 in a manner making one or more features or functions of the mobile computing device 12 available for use. For example, a holder 16 may include or form a front aperture 59a or opening 59a enabling an owner of a mobile computing device 12 to view a display screen of the mobile computing device 12 while the mobile computing device 12 is being held by the holder 16. In selected embodiments, such an aperture 59a may provide an unobstructed view and/or unobstructed touch access to an entire display (e.g., touch screen) of a mobile computing device 12. Alternatively, or in addition thereto, a holder 16 may include or form a camera aperture 59b (e.g., a back aperture 59b) enabling a camera 50 (e.g., a back-facing camera) of a mobile computing device 12 to scan or capture one or more products (e.g., one or more barcodes of one or more products) while the mobile computing device 12 is being held by the holder 16.

A holder 16 may hold a mobile computing device 12 in a location and/or orientation making one or more features or functions of the mobile computing device 12 convenient for use. For example, in selected embodiments, a mount 58 may be flexible and/or selectively positionable, thereby enabling a customer to select, within certain limits, the location and/or orientation at which his or her mobile computing device 12 is to be held. Alternative, a holder 16 may be more fixed.

For example, a holder 16 may be fixed in place to hold a mobile computing device 12 with the display screen facing a customer pushing or otherwise managing a corresponding mobile shopping aid 14. Additionally, a back-facing camera 50 of the mobile computing device 12 may be accessible to scan or capture one or more barcodes or the like. For example, holder 16 may hold a mobile computing device 12 with a back-facing camera 50 aimed toward an interior of a basket or the like of a mobile shopping aid 14. Accordingly, a customer may easily scan or capture one or more products as they are placed within or on a mobile shopping aid 14.

A holder 16 in accordance with the present invention may receive, engage, or hold a mobile computing device 12 in any suitable manner. For example, in selected embodiments, a holder 16 may passively receive a mobile computing device 12. Alternatively, a holder 16 may actively engage, clamp, or otherwise grip mobile computing device 12.

A holder 16 may be configured to receive, engage, or hold mobile computing devices 12 of different sizes. In certain embodiments, a holder 16 may include two or more parts or portions that selectively move with respect to one another. Accordingly, one or more components of a holder 16 may flex, pivot, translate, or the like to receive and grip various mobile computing devices 12 of different make and model.

For example, in selected embodiments, a holder 16 may include a base 60 and a traveler 62. A traveler 62 may selectively flex, pivot, translate, or the like or a combination or sub-combination thereof with respect to a base 60. A traveler 62 may be biased toward a base 60. Accordingly, a mobile computing device 12 may be positioned and gripped between a base 60 and traveler 62.

In certain embodiments, a base 60 may include a race or rail shaped to interface with (e.g., translate with respect to) a respective rail or race of a corresponding traveler 62. For example, a base 60 may include a race 64 shaped to interface with a rail 66 of a corresponding traveler 62. As the traveler 62 moves with respect to the base 60, the rail 66 may translate within the race 64. The interaction between a race 64 and rail 66 may define, control, or limit the motion between a traveler 62 and a base 60. For example, the interaction between a race 64 and rail 66 may limit the motion between a traveler 62 and base 60 to translation 68 to open a holder 16 (e.g., to receive or release a mobile computing device 12) and translation 70 to close a holder 12 (e.g., to grip a mobile computing device 12).

A holder 16 may include a lock to selectively fix a traveler 62 with respect to a base 60, thereby securing a mobile computing device 12 therebetween. In selected embodiments such a lock may prevent or resist unauthorized removal of a mobile computing device 12 from a holder 16. Alternatively, or in addition thereto, a holder 16 may include a biasing mechanism 72 (e.g., coil spring or the like) urging a traveler 62 toward a base 60 to engage, grip, or clamp a mobile computing device 12 therebetween.

For example, a holder may include a biasing mechanism 72 and a stop 74. In selected embodiments, in an assembly process, a stop 74 may be applied or inserted after a rail 66 has been inserted within a race 64 and a biasing mechanism 72 has been installed. Accordingly, a biasing mechanism 72 may act against a stop 74 in biasing a traveler 62 toward a base 60. A stop 74 may also block certain motion of a traveler 62 (e.g., limit the translation 68 as a traveler 62 moves to "open" a holder 16), prevent inadvertent disassembly of a holder 16, or the like or a combination thereof.

In selected embodiments, a holder 16 may include various features or structures to improve the operation thereof. For example, a holder 16 may include a handle 76, grip 76, extension 76, or the like enabling a customer to more easily manipulate a traveler 62. In certain embodiments, a holder 16 may include features supporting secure engagement of a mobile computing device 12. For example, a base 60 and/or traveler 62 may include one or more flanges 78 that extend to support or bracket a mobile computing device 12. Alternatively, or in addition thereto, a base 60 and/or traveler 62 may include one or more inserts 80, strips 80, patches 80, or the like formed of a grip material (e.g., an elastomer or the like). Such structures 80 may support a desired engagement with a mobile computing device 12 by gripping and/or conforming to the mobile computing device 12.

Figure 9:
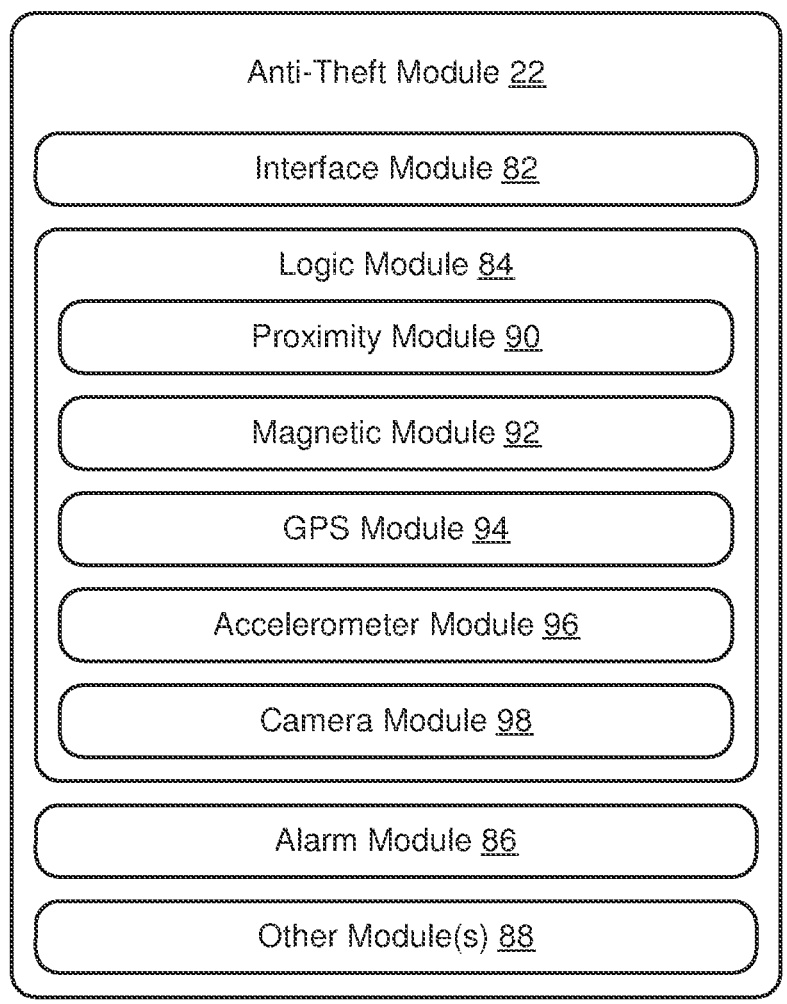
FIG. 9 is a schematic block diagram of one embodiment of an anti-theft module in accordance with the present invention.

Referring to FIG. 9, an anti-theft module 22 in accordance with the present invention may be programmed to protect a mobile computing device 12 against theft or unauthorized use. An anti-theft module 22 may include any suitable arrangement of sub-components or modules. In certain embodiments, an anti-theft module 22 may include an interface module 82, logic module 84, alarm module 86, one or more other modules 88 as desired or necessary, or the like or some combination or sub-combination thereof.

An interface module 82 may enable an anti-theft module 22 to differentiate authorized users from unauthorized users. For example, an interface module 82 may receive, process, record, and/or authenticate one or more access codes, biometrics, or the like. In selected embodiments, an interface module 82 may request, receive, activate, and/or implement an authorization code, action, or the like to lock a mobile computing device 12 to a holder 16. Accordingly, an interface module 82 may require receipt or execution of an authorization code, action, or the like to unlock a mobile computing device 12 from a holder 16. Should an anti-theft module 22 detect that a mobile computing device 12 has been removed from a holder 16 without the interface module 82 receiving a proper unlock instruction, the anti-theft module 22 may initiate an alarm protocol.

A logic module 84 may analyze various inputs in an effort to detect when a mobile computing device 12 is removed from a holder 16. In selected embodiments, one or more inputs analyzed by a logic module 84 may include signal output by one or more sensors of a sensor suite 38. Accordingly, a logic module 84 may include any suitable arrangement of sub-components or modules programmed or otherwise configured to analyze such inputs. In certain embodiments, a logic module 84 may include a proximity module 90, magnetic module 92, GPS module 94, accelerometer module 96, camera module 98, one or more other modules as desired or necessary, or the like or some combination or sub-combination thereof.

A proximity module 90 may analyze one or more signals output by one or more proximity sensors 42 to detect when a mobile computing device 12 is removed from a holder 16. For example, a mobile computing device 12 may include a light-based proximity sensor 42. Such a sensor 42 may detect changes in ambient light. Accordingly, a proximity module 90 may monitor the output of a light-based proximity sensor 42 for changes in ambient light that may be characteristic of being removed from a holder 16.

For example, in a holder 16, a light-based proximity sensor 42 may be generally facing or detecting the overhead lights of a store. When removed from a holder 16, the light detected by a light-based proximity sensor 42 may decrease (e.g., as the mobile computing device 12 is reoriented, covered by a hand, pocketed, or the like). Accordingly, a change (e.g., decrease) of a certain magnitude in the light detected by a light-based proximity sensor 42 may be an indicator that a mobile computing device 12 has been removed from a holder 16.

A magnetic module 92 may analyze one or more signals output by one or more magnetic sensors 44 to detect when a mobile computing device 12 is removed from a holder 16. For example, a mobile computing device 12 may include a magnetic flux sensor 44. Such a sensor 44 may detect changes in orientation and/or strength of a magnetic field. Accordingly, a magnetic module 92 may monitor the output of a magnetic flux sensor 44 for changes in magnetic flux that may be characteristic of being removed from a holder 16.

For example, in selected embodiments, a holder 16 and/or mobile shopping aid 14 may correspond to or generate a magnetic field (e.g., a magnetic field too weak to disrupt one or more communication systems 36 of a mobile computing device 12). When removed from a holder 16, the magnetic flux detected by a magnetic flux sensor 44 may decrease and/or change orientation. Accordingly, a change of a certain magnitude in the magnetic field detected by a magnetic flux sensor 44 may be an indicator that a mobile computing device 12 has been removed from a holder 16.

A GPS module 94 may analyze one or more signals output by one or more GPS receivers 46 to detect when a mobile computing device 12 is removed from a holder 16. For example, one or more GPS receivers 46 may provide a mechanism for determining a location, speed, or the like of a mobile computing device 12. Accordingly, certain changes in location, speed, or the like may be identified and used an indicator that a mobile computing device 12 has been removed from a holder 16.

An accelerometer module 96 may analyze one or more signals output by one or more accelerometers 48 to detect when a mobile computing device 12 is removed from a holder 16. For example, a holder 16 may hold a mobile computing device 12 in a substantially fixed or constant orientation. One or more accelerometers 48 may detect changes in the orientation of a mobile computing device 12. Accordingly, a change of a certain magnitude in the orientation detected by one or more accelerometer 48 may be an indicator that a mobile computing device 12 has been removed from a holder 16.

Referring to FIGS. 9-12, a camera module 98 may analyze one or more signals output by one or more cameras 50 to detect when a mobile computing device 12 is removed from a holder 16. For example, a camera module 98 may identify and monitor the presence of one or more security icons 100 in one or more images 102 captured by a camera 50. Accordingly, a change in the location and/or presence of one or more security icons 100 in one or more images 102 may be an indicator that a mobile computing device 12 has been removed from a holder 16.

A security icon 100 in accordance with the present invention may have any suitable shape, combination of shapes, colors, combinations of colors, or the like or combinations or sub-combinations thereof. In general, a security icon 100 may be selected to support quick and easy recognition thereof by a camera module 98.

A security icon 100 may be located at any suitable position. In selected embodiments, a security icon 100 may be incorporated into or displayed on one or more pieces or portions of a mobile shopping aid 14, holder 16, or the like at locations where they may be viewed by a camera 50 (e.g., front-facing camera or rear-facing camera) of a mobile computing device 12. For example, one or more security icons 100 may be incorporated into or displayed on one or more walls 54, edges 56, or the like of a mobile shopping aid 14. Alternatively, or in addition thereto, one or more security icons 100 may be incorporated into or displayed on a holder 16.

For example, in selected embodiments, a holder 16 may include one or more supports 104. A support 104 may position, support, and/or form one or more security icons 100 at a location (e.g., a fixed location) within the field of view of a front-facing or rear-facing camera 50. For example, one or more supports 104 may extending from a back side of a holder 16 to position one or more respective security icons 100 within the field of view of a rear-facing camera 50. Accordingly, a change in the location and/or presence of one or more security icons 100 in one or more images 102 may be an indicator that a mobile computing device 12 has been removed from the holder 16.

In certain embodiments, one or more supports 104 and/or security icons 100 in accordance with the present invention may perform one or more non-security-related functions. For example, one or more supports 104 and/or security icons 100 may form a positioning aid indicating to a customer where a barcode or the like may be positioned to be captured by a camera 50. Such supports 104 and/or security icons 100 may indicate or communicate a proper alignment, a proper (e.g., minimum) focal distance, or a combination thereof.

A logic module 84 may detect removal of a mobile computing device 12 from a holder 16 in any suitable manner. In selected embodiments, such detection may be based on the inputs received from a single sensor of a sensor suite 38. For example, removal may be detected when one or more security icons 100 can no longer be identified within one or more images 102 captured by a camera 50. Alternatively, detection may be based on the inputs received from more than one sensor of a sensor suite 38. For example, removal may be detected when a multiple modules (e.g., a proximity module 90 and an accelerometer module 96) simultaneously indicate a removal event has likely occurred.

In selected embodiments, a logic module 84 may act to preserve the battery of a mobile computing device 12. Certain functions of a logic module 84 may consume significant electrical energy. If left unchecked, such functions may deplete the battery of a mobile computing device 12 in a relatively short period of time. Accordingly, a logic module 84 may limit power consumption via one or more sampling techniques, low-power monitoring modes, or the like. For example, a logic module 84 may periodically pulse a camera 50 to determine whether a barcode, security icon 100, or the like is in view.

An alarm module 86 may define, control, implement, initiate, or the like an alarm protocol. An alarm protocol may be a collection of one or more steps or actions aimed at preventing the theft of a mobile computing device 12. Such steps or actions may include requiring entry of a particular code or the like, playing audible speech or noise through one or more speakers of a mobile computing device 12, generating one or more electronic messages to store personnel (e.g., store security personnel), tracking a position of a mobile computing device 12, or the like or a combination or sub-combination thereof.

In selected embodiments, an alarm protocol may be progressive in nature. For example, a first step may be to play, through one or more speakers of a mobile computing device 12, audible speech requesting entry of a security code or the like. This may draw attention to the mobile computing device 12. Thus, an owner of the mobile computing device 12 may be altered to the fact that something is happening with the device 12. If a proper security code or the like is timely received (e.g., received within a specified number of seconds) an alarm protocol may be aborted. Conversely, if no proper security code or the like is timely received, the alarm protocol may advance to a more aggressive step (e.g., paying an audio noise-based alarm, issue an alert to store personnel through one or more communication systems 36, communicate a location to store personnel, or the like or a combination or sub-combination thereof).

The various functions or modules of an anti-theft module 22 may be enacted or implemented by any suitable system or component thereof. For example, in selected embodiments, one or more functions or modules of an anti-theft module 22 may be distributed across one or more hardware devices, including a primary computer of a POS system, an on-site (e.g., in-store) server or resource, an off-site server or resource, a mobile computing device 12, or the like or combinations or sub-combinations thereof. Thus, systems and methods in accordance with the present invention may be adapted to a wide variety of situations.

Figure 13:
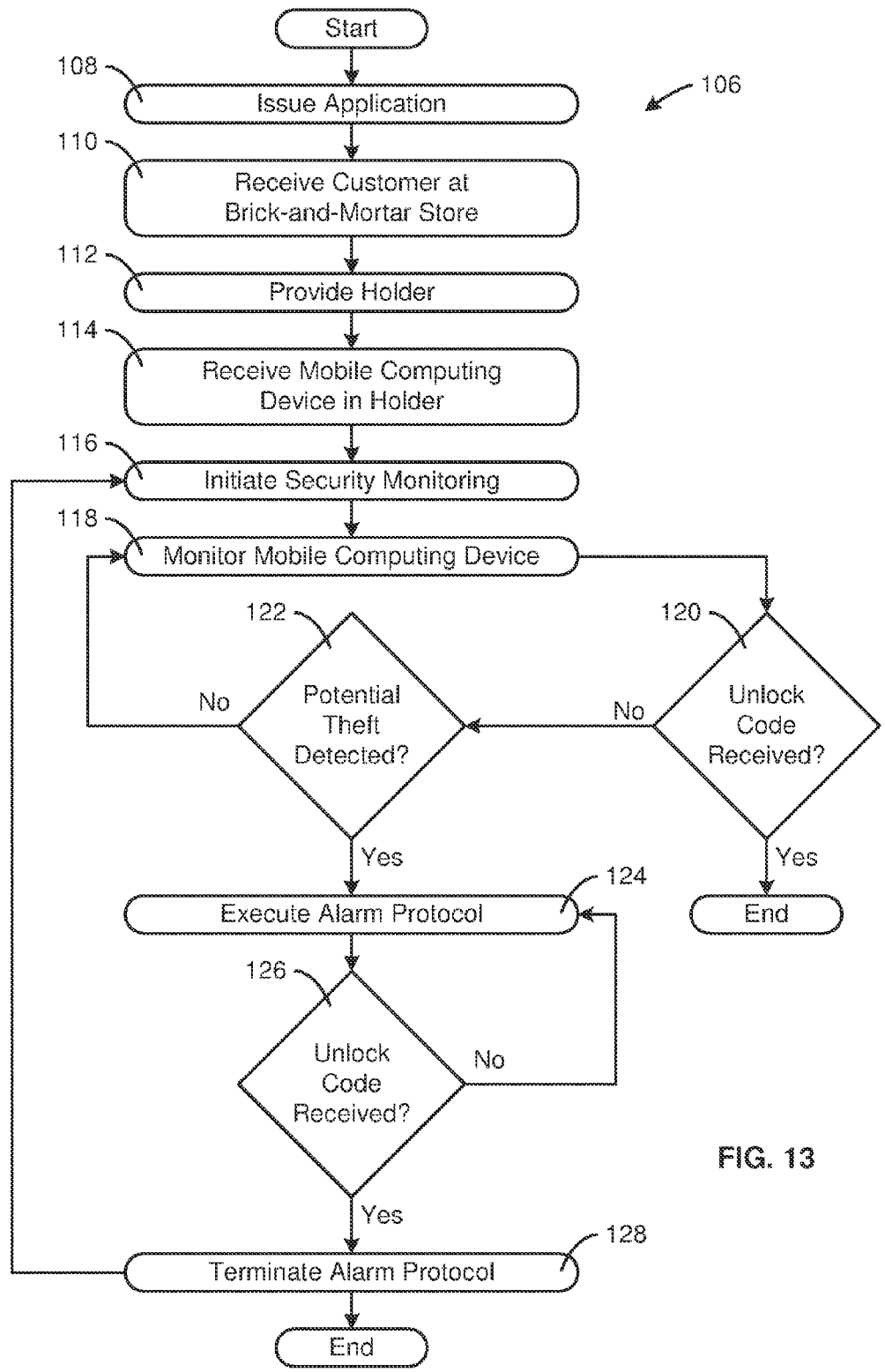
FIG. 13 is a schematic block diagram illustrating one embodiment of a method in accordance with the present invention.

Referring to FIG. 13, one method 106 in accordance with the present invention may begin when an appropriate application (e.g., a retailer's mobile application, electronic receipts application, self-checkout application, browser, or the like or a combination or sub-combination thereof) including or interfacing with an anti-theft module 22 is issued 108 and installed on a mobile computing device 12 of a customer. So prepared, a customer may then be received 110 with his or her mobile computing device 12 at a "brick-and-mortar" store. At the store, a holder 16 (e.g., a mobile shopping aid 14 equipped with a holder 16) may be provided 112 to the customer. Accordingly, the holder 16 may receive 114 and hold the customer's mobile computing device 12. Additionally, security monitoring of the mobile computing device 12 may be initiated 116.

Security monitoring of a mobile computing device 12 may be initiated 116 in any suitable manner. In selected embodiments, a customer may place his or her mobile computing device 12 in a holder 16, then select or activate a "lock" or "secure" option provided by an anti-theft module 22. Alternatively, an anti-theft module 22 may detect when a mobile computing device 12 has been received 114 in a holder 16 and automatically initiate 116 security monitoring. For example, once placed in a holder 16, an anti-theft module 22 may recognize one or more security icons 100 within the field of view of a camera 50 and automatic initiate 116 security monitoring.

Once initiated 116, monitoring 118 of a mobile computing device 12 may continue until a proper unlock code or the like is received 120 from a customer or a potential theft, authorized use, or the like is detected 122. If a potential theft, unauthorized use, or the like is detected 122, an alarm protocol may be executed 124. Once execution 124 of an alarm protocol has begun, it may continue (e.g., progress through one or more steps or actions) until a proper unlock code or the like is received 126 from a customer. If a proper unlock code or the like is received 126 from a customer, the alarm protocol may be terminated 128. In selected embodiments, termination 128 of an alarm protocol may be followed by another initiation 116 (automatic or otherwise) of security monitoring.

The flowchart in FIG. 13 illustrates the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A shopping system comprising:
   a mobile shopping aid sized to support thereon or therewithin one or more items to be purchased at a brick and mortar store;
   a holder connected to the mobile shopping aid to assist shopping at the brick and mortar store; and
   a security icon coupled to at least one of the holder or the mobile shopping aid;
   wherein:
      the holder is sized and shaped to hold a mobile computing device;
      the holder has a front aperture enabling a customer of the brick and mortar store to use the mobile computing device to view a display screen of the mobile computing device while the mobile computing device is being held by the holder connected to the mobile shopping aid;
      the holder has a back aperture enabling a back-facing camera of the mobile computing device to scan one or more barcodes of the one or more items while the mobile computing device is being held by the holder connected to the mobile shopping aid; and while the mobile computing device is being held by the holder connected to the mobile shopping aid, the back-facing camera of the mobile computing device captures the security icon so that an anti-theft application on the mobile computing device does not generate an alarm.

2. The system of claim 1, further comprising the mobile computing device.

3. The system of claim 1, wherein the security icon is positioned on the mobile shopping aid so as to be captured by the back-facing camera of the mobile computing device.

4. The system of claim 1, wherein the security icon is positioned on the holder so as to be captured by the back-facing camera of the mobile computing device.

5. The system of claim 1, wherein one or more security icons are positioned so as to be captured by a front-facing camera of the mobile computing device.

6. The system of claim 1, wherein:
the holder comprises an icon support; and
one or more security icons are located on the icon support and positioned so as to be captured by a front-facing camera of the mobile computing device.

7. The system of claim 1, wherein, the anti-theft application running on the mobile computing device comprises a user interface to authenticate at least a security code, an access code, or a biometric authorization, entered into the mobile computing device by the customer to activate an alarm protocol.

8. The system of claim 7, wherein the anti-theft application is programmed to initiate the alarm protocol and generate the alarm in an event that the back-facing camera of the mobile computing device does not capture the security icon.

9. The system of claim 7, wherein the anti-theft application is further programmed to terminate the alarm protocol upon receipt of at least a security code, an access code, or a biometric authorization entered into the mobile computing device by the customer.

10. The system of claim 7, wherein the anti-theft application is programmed to initiate the alarm protocol in an event that a front-facing camera of the mobile computing device does not capture the security icon.

11. The system of claim 1, wherein the mobile shopping aid comprises one of a shopping basket or a shopping cart.

12. The system of claim 1, wherein the front aperture provides the customer an unobstructed view of the display screen.

13. A method comprising:
offering, to a customer at a brick-and-mortar store, a mobile shopping aid sized to support thereon or therewithin one or more items to be purchased;
the offering further comprising offering, to the customer at the brick-and-mortar store, the mobile shopping aid with a holder connected thereto to assist shopping at the brick and mortar store; and
the offering further comprising a security icon coupled to at least one of the holder or the mobile shopping aid, wherein:
the holder is sized and shaped to hold a mobile computing device;
the holder has a front aperture enabling the customer of the brick and mortar store to use the mobile computing device to view a display screen of the mobile computing device while the mobile computing device is being held by the holder connected to the mobile shopping aid;
the holder has a back aperture enabling a back-facing camera of the mobile computing device to scan one or more barcodes of the one or more items while the mobile computing device is being held by the holder connected to the mobile shopping aid; and
while the mobile computing device is being held by the holder connected to the mobile shopping aid, the back-facing camera of the mobile computing device captures the security icon so that an anti-theft application on the mobile computing device does not generate an alarm.

14. The method of claim 13, further comprising the mobile computing device.

15. The method of claim 13, wherein the security icon is positioned so as to be captured by a front-facing camera of the mobile computing device.

16. The method of claim 13, wherein:
the holder comprises an icon support; and
one or more security icons located on the icon support and positioned so as to be captured by a front-facing camera of the mobile computing device.

17. The method of claim 13, wherein the anti-theft application running on the mobile computing device comprises a user interface to authenticate at least a security code, an access code, or a biometric authorization, entered into the mobile computing device by the customer to activate an alarm protocol.

18. The method of claim 13, wherein the anti-theft application is further programmed to terminate an alarm protocol upon receipt of at least a security code, an access code, or a biometric authorization entered into the mobile computing device by the customer.

19. The method of claim 13, wherein the anti-theft application is programmed to initiate an alarm protocol and generate the alarm in an event that the back-facing camera or a front-facing camera of the mobile computing device does not capture the security icon.

20. The method of claim 13, wherein the mobile shopping aid comprises one of a shopping basket or a shopping cart.

* * * * *